US012566567B2

(12) United States Patent
Segev et al.

(10) Patent No.: US 12,566,567 B2
(45) Date of Patent: Mar. 3, 2026

(54) TECHNIQUES FOR DISCOVERING DATA STORE LOCATIONS VIA INITIAL SCANNING

(71) Applicant: Cyera, Ltd., Tel Aviv (IL)

(72) Inventors: Yotam Segev, Tel Aviv (IL); Itamar Bar-Ilan, Tel Aviv (IL); Yonatan Itai, Tel Aviv (IL); Shay Makayes, Tel Aviv (IL); Shani Beracha, Tel Aviv (IL); Omer Duchovne, Tel Aviv (IL); Itay Fainshtein, Tel Aviv (IL)

(73) Assignee: Cyera, Ltd., Tel Aviv (IL)

( * ) Notice: Subject to any disclaimer, the term of this patent is extended or adjusted under 35 U.S.C. 154(b) by 528 days.

(21) Appl. No.: 17/664,139

(22) Filed: May 19, 2022

(65) Prior Publication Data
US 2023/0221881 A1 Jul. 13, 2023

Related U.S. Application Data

(63) Continuation-in-part of application No. 17/647,899, filed on Jan. 13, 2022, now Pat. No. 12,026,123.

(51) Int. Cl.
*G06F 16/00* (2019.01)
*G06F 3/06* (2006.01)

(52) U.S. Cl.
CPC .......... *G06F 3/0655* (2013.01); *G06F 3/0604* (2013.01); *G06F 3/065* (2013.01); *G06F 3/0676* (2013.01)

(58) Field of Classification Search
CPC ...... G06F 3/065; G06F 3/0655; G06F 3/0676; G06F 3/0604; G06F 16/128; G06F 16/11

USPC .......................................................... 707/723
See application file for complete search history.

(56) References Cited

U.S. PATENT DOCUMENTS

| | | | |
|---|---|---|---|
| 7,392,356 B1 | 6/2008 | Hardman | |
| 8,443,449 B1 | 5/2013 | Fan et al. | |
| 9,021,200 B1 * | 4/2015 | Kushmerick | ....... G06F 12/0215 |
| | | | 711/170 |

(Continued)

FOREIGN PATENT DOCUMENTS

| | | |
|---|---|---|
| CN | 102194073 A | 9/2011 |
| CN | 103563278 A | 2/2014 |

(Continued)

OTHER PUBLICATIONS

International Search Report for PCT/IB2023/050264, dated Apr. 20, 2023. International Search Report.

(Continued)

*Primary Examiner* — Alexandria Y Bromell
(74) *Attorney, Agent, or Firm* — M&B IP Analysts, LLC

(57) ABSTRACT

A system and method for discovering data store locations. A method includes reading, for each disk of a plurality of disks deployed in a cloud environment, only a portion of a snapshot of the disk accessed via a cloud provider tool, wherein the portion of the snapshot of each disk accessed via the cloud provider tool includes file system metadata of a file system of the disk, wherein the cloud provider tool is configured to provide direct access to data from each of the plurality of disks; analyzing the portion of the snapshot of each disk of the plurality of disks to determine whether each disk contains a data store; and identifying, based on the analysis, at least one data store in the cloud environment.

13 Claims, 6 Drawing Sheets

(56) References Cited

U.S. PATENT DOCUMENTS

| | | | |
|---|---|---|---|
| 9,747,293 | B2 | 8/2017 | Hazel et al. |
| 10,192,052 | B1 | 1/2019 | Singh et al. |
| 10,253,716 | B2 | 4/2019 | Mentele |
| 11,372,811 | B1 | 6/2022 | Ciubotariu et al. |
| 11,531,931 | B2 | 12/2022 | Enuka et al. |
| 11,556,659 | B1 | 1/2023 | Kumar et al. |
| 11,853,104 | B2 | 12/2023 | Naidu et al. |
| 2006/0235892 | A1* | 10/2006 | Kalach ................. G06F 11/3485 707/707 |
| 2008/0250085 | A1 | 10/2008 | Gray et al. |
| 2009/0043978 | A1 | 2/2009 | Sawdon et al. |
| 2010/0169595 | A1 | 7/2010 | Bryant-Rich |
| 2012/0117459 | A1* | 5/2012 | DeHaven .............. G06F 16/957 715/234 |
| 2012/0118459 | A1* | 5/2012 | Miyake ................... B60C 11/13 152/209.18 |
| 2014/0229692 | A1 | 8/2014 | Goldberg et al. |
| 2015/0127768 | A1 | 5/2015 | Zamir et al. |
| 2015/0381435 | A1* | 12/2015 | Todd ...................... G06F 9/5072 709/223 |
| 2016/0162364 | A1 | 6/2016 | Mutha et al. |
| 2016/0342481 | A1 | 11/2016 | Nanivadekar |
| 2017/0131913 | A1* | 5/2017 | Gordon ................. G06F 3/0605 |
| 2017/0212915 | A1 | 7/2017 | Borate et al. |
| 2017/0220777 | A1 | 8/2017 | Wang et al. |
| 2018/0260281 | A1 | 9/2018 | Monk |
| 2019/0052643 | A1 | 2/2019 | Doshi et al. |
| 2020/0007620 | A1* | 1/2020 | Das ......................... H04L 67/62 |
| 2020/0050966 | A1 | 2/2020 | Enuka et al. |
| 2021/0019229 | A1* | 1/2021 | Kucherov ............. G06F 16/128 |
| 2021/0150056 | A1 | 5/2021 | Vax et al. |
| 2021/0216407 | A1 | 7/2021 | Borate et al. |
| 2021/0256156 | A1 | 8/2021 | Enuka et al. |
| 2021/0374163 | A1* | 12/2021 | Wang .................. G06F 11/3428 707/707 |
| 2022/0318099 | A1 | 10/2022 | Kotwal et al. |
| 2023/0083104 | A1 | 3/2023 | Xiang et al. |
| 2023/0118349 | A1* | 4/2023 | Mathews .............. G06F 16/134 707/692 |
| 2023/0132591 | A1 | 5/2023 | Karr et al. |
| 2023/0138337 | A1 | 5/2023 | Mufti |
| 2023/0221881 | A1 | 7/2023 | Segev et al. |
| 2023/0409538 | A1 | 12/2023 | Bisht et al. |
| 2024/0385979 | A1 | 11/2024 | Lin et al. |
| 2024/0419555 | A1 | 12/2024 | Chakeres et al. |
| 2025/0110921 | A1 | 4/2025 | Nagarajan et al. |

FOREIGN PATENT DOCUMENTS

| | | |
|---|---|---|
| CN | 104182519 A | 12/2014 |
| CN | 112149142 A | 12/2020 |
| WO | 2021170228 A1 | 9/2021 |

OTHER PUBLICATIONS

Written Opinion of the Searching Authority for PCT/IB2023/050264, dated Apr. 20, 2023. International Search Report.

Chung Hyunji et al: "Digital forensic 1-15 investigation of cloud storage services", Digital Investigation, [Online] vol. 9, No. 2, Jun. 23, 2012 (Jun. 23, 2012), pp. 81-95, XP093289492, Amsterdam, NL ISSN: 1742-2876, DOI: 10.1016/j.diin.2012.05.015 Retrieved from the Internet: URL: https://arxiv.org/pdf/1709.10395> [retrieved on Jun. 24, 2025] * sections 1, 3; appendix A-D *.

European Search Report for EP 23740162.5, dated Jul. 8, 2025. European Patent Office, The Hague, Netherlands.

* cited by examiner

TECHNIQUES FOR DISCOVERING DATA STORE LOCATIONS VIA INITIAL SCANNING

CROSS-REFERENCE TO RELATED APPLICATIONS

This application is a continuation-in-part of U.S. patent application Ser. No. 17/647,899 filed on Jan. 13, 2022, now pending, the contents of which are hereby incorporated by reference.

TECHNICAL FIELD

The present disclosure relates generally to cloud computing data management, and more specifically to identifying data stores in cloud environments.

BACKGROUND

To protect cloud environments, many cybersecurity solution providers seek to identify data sources, particularly data sources which store sensitive data. This identification of data stores can, in turn, be utilized to access data in those data sources, classify it to determine its sensitivity, determine appropriate protective measures suited for this data, detect and prioritize data risks, and remediate those risks.

Existing solutions require information about such data sources in order to implement protection solutions. This information is usually manually identified and provided by a security team for the organization that owns or otherwise operates the cloud environment. In addition to making deployment slower and less efficient, the manual identification and additional steps required introduce new possibilities of human error which may result in inaccurate or incomplete data source information being provided to cybersecurity systems. Consequently, the cloud environment is not optimally protected against cybersecurity threats.

Additionally, existing solutions typically require obtaining permission to access each data store in a cloud environment, and such access is usually realized through a server or agent deployed in the same cloud environment that is connected to a network in which the data store is located. These existing solutions require manually identifying and granting permission for each data store, which is cumbersome. Moreover, these solutions can only protect data stores that the cloud environment owner is aware of. Since cloud environment owners do not always maintain a fully comprehensive list of data stores in the cloud environment and retrieving this information requires a high degree of technical expertise, these solutions may fail to analyze data in data stores which are deployed in the cloud environment.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for discovering data store locations. The method comprises: reading, for each disk of a plurality of disks deployed in a cloud environment, only a portion of a snapshot of the disk accessed via a cloud provider tool, wherein the portion of the snapshot of each disk accessed via the cloud provider tool includes file system metadata of a file system of the disk, wherein the cloud provider tool is configured to provide direct access to data from each of the plurality of disks; analyzing the portion of the snapshot of each disk of the plurality of disks to determine whether each disk contains a data store; and identifying, based on the analysis, at least one data store in the cloud environment.

Certain embodiments disclosed herein also include a non-transitory computer readable medium having stored thereon causing a processing circuitry to execute a process, the process comprising: reading, for each disk of a plurality of disks deployed in a cloud environment, only a portion of a snapshot of the disk accessed via a cloud provider tool, wherein the portion of the snapshot of each disk accessed via the cloud provider tool includes file system metadata of a file system of the disk, wherein the cloud provider tool is configured to provide direct access to data from each of the plurality of disks; analyzing the portion of the snapshot of each disk of the plurality of disks to determine whether each disk contains a data store; and identifying, based on the analysis, at least one data store in the cloud environment.

Certain embodiments disclosed herein also include a system for discovering data store locations. The system comprises: a processing circuitry; and a memory, the memory containing instructions that, when executed by the processing circuitry, configure the system to: read, for each disk of a plurality of disks deployed in a cloud environment, only a portion of a snapshot of the disk accessed via a cloud provider tool, wherein the portion of the snapshot of each disk accessed via the cloud provider tool includes file system metadata of a file system of the disk, wherein the cloud provider tool is configured to provide direct access to data from each of the plurality of disks; analyze the portion of the snapshot of each disk of the plurality of disks to determine whether each disk contains a data store; and identify, based on the analysis, at least one data store in the cloud environment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
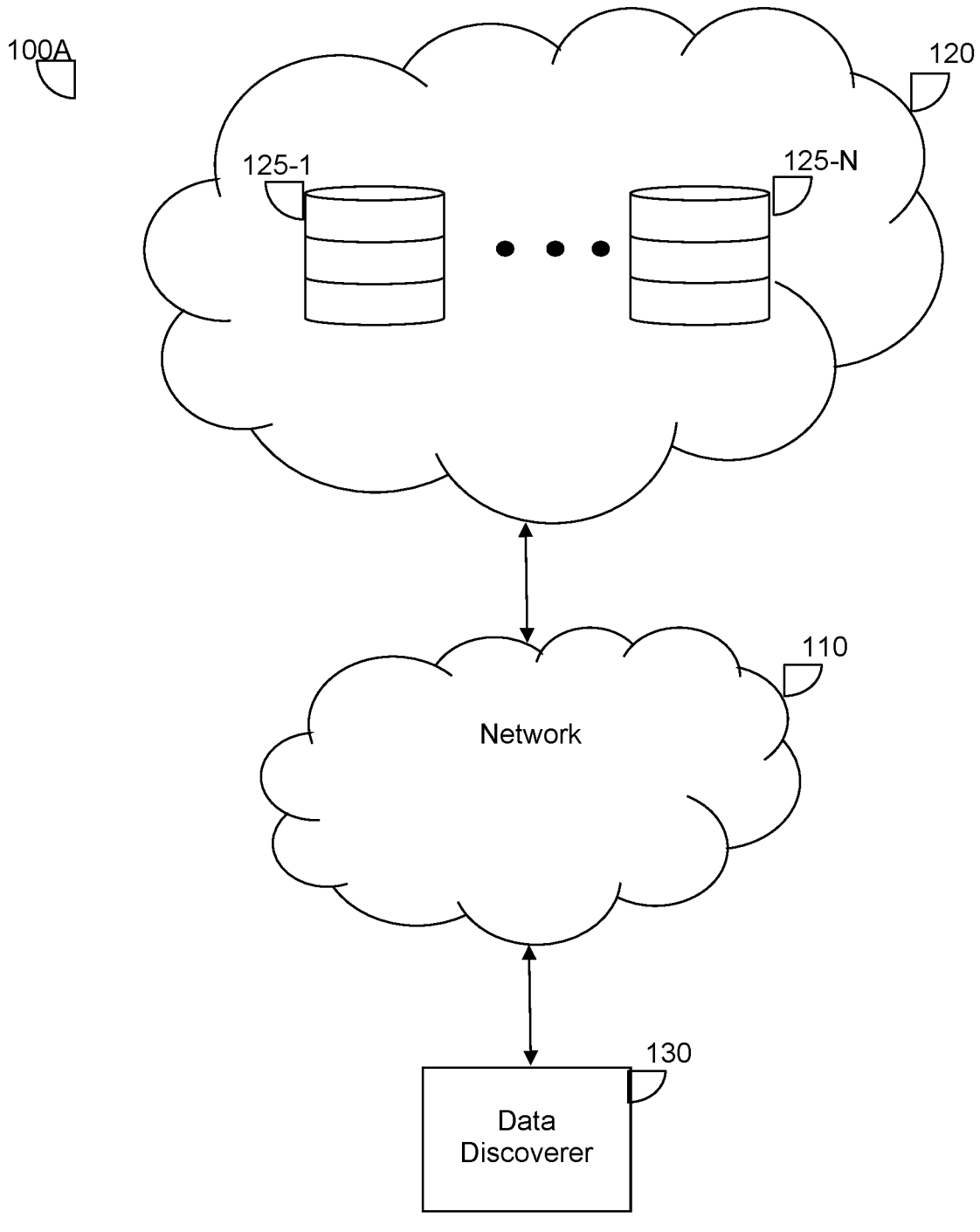
FIGS. 1A-B are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for discovering data store locations and for efficiently scanning cloud environments using discovered data store locations. Various disclosed embodiments use cloud provider tools in order to directly access only portions of snapshots of disks in a cloud environment and, in particular, to access portions of snapshots including the file system metadata. The disclosed embodiments are therefore capable of directly accessing specific portions of virtual disks deployed in cloud environments.

A portion of each snapshot including file system metadata is read via a cloud provider tool configured to provide direct access to the snapshots, i.e., without requiring copying the entire snapshot and then reading from the copy. Based on the portion of each snapshot that is read, it is determined whether each disk contains a data store. To this end, a likelihood that each disk contains a data store may be determined based on known patterns in file system metadata such as file name, file type, directory information, file path, or a combination thereof. If the likelihood for a disk is above a threshold, it is determined that the disk contains a data store.

In this regard, it has been identified that sampling only from the metadata indicative of aspects of the file system like structure allows for reducing the amount of data that needs to be analyzed in order to determine, with high confidence, whether the disk contains a data store. More specifically, the file system metadata is a subset of the data stored on the disk, and only a portion of the file system structure metadata needs to be analyzed in order to successfully determine whether a disk likely contains a data store. It has further been identified that, as compared to analyzing the entirety of each disk, analyzing a portion only of the file system metadata in each disk reduces the average amount of data needed to identify disks containing data stores.

Each data store is a service which is adapted to store data, and may contain data in a structured or unstructured format. Non-limiting example data stores may include relational databases, NoSQL databases, file/object/blob storage servers/services, custom data stores, and the like.

Further, the determination of whether each disk contains a data store may be utilized to efficiently scan the cloud environment for applications in which only data stores need to be scanned. Once the data store locations are discovered by identifying which disks contain data stores, the system only performs a full scan for these disks containing data stores. To this end, in various disclosed embodiments, snapshots of disks are scanned in order to determine whether there is a data store over each disk. Once data stores have been identified, data in the data stores can be accessed. In some embodiments, accessing the data in each data store includes creating an engine based on a known engine type and version, connecting the created engine for each data store to that data store, and querying the data store using the connected engine.

In some embodiments, the initial scan of a disk is performed using an abstraction layer that is created such that most scanning software components are unaware of the underlying usage of the cloud provider mechanism to fetch the storage blocks from the disk snapshot in order to scan the disk snapshot. This abstraction layer is realized by creating a mount to the storage device containing the disk and using the mount to create a readable dataset. In some embodiments, the mount is a lazy mount in which only needed blocks are fetched, but the scanning component can scan the target file system as if it were a local file system.

The various disclosed embodiments provide techniques which allow for identifying data stores in environments such as cloud computing environments. The disclosed embodiments therefore allow for analyzing data in such data stores without requiring manual identification of those data stores, and particularly allow for more efficiently scanning disks via initial scans.

Specifically, during the initial scans as described herein, only a limited portion of each disk is read. The limited portion of each disk being read is used to determine whether the disk contains a data store. In a further embodiment, the limited portion of each disk being read includes only a limited portion of file system metadata. The disclosed embodiments therefore allow for conserving computing resources needed for scanning disks, particularly when many disks need to be scanned.

FIG. 1A shows an example network diagram 100A utilized to describe various disclosed embodiments. In the example network diagram 100, a data discoverer 130 communicates with components in a cloud environment 120 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As shown in FIG. 1A, the cloud environment 120 includes various disks 125-1 through 125-N (hereinafter referred to individually as a disk 125 or collectively as disks 125 for simplicity). The disks 125 may be, but are not limited to, hard drive disks, virtual disks, and the like. Some of the disks 125 may contain data stores (not depicted in FIG. 1A) and therefore such data stores may need to be identified in order to provide certain security features to protect those data stores. To this end, the data discoverer 130 is configured to perform initial scans of data structures in the cloud environment 120 as described herein in order to identify which of the disks 125 contain data stores. The data discoverer 130 may further be configured to access data in identified data stores, and therefore identify where protective measures may be needed in order to protect the data stores.

Figure 1B:
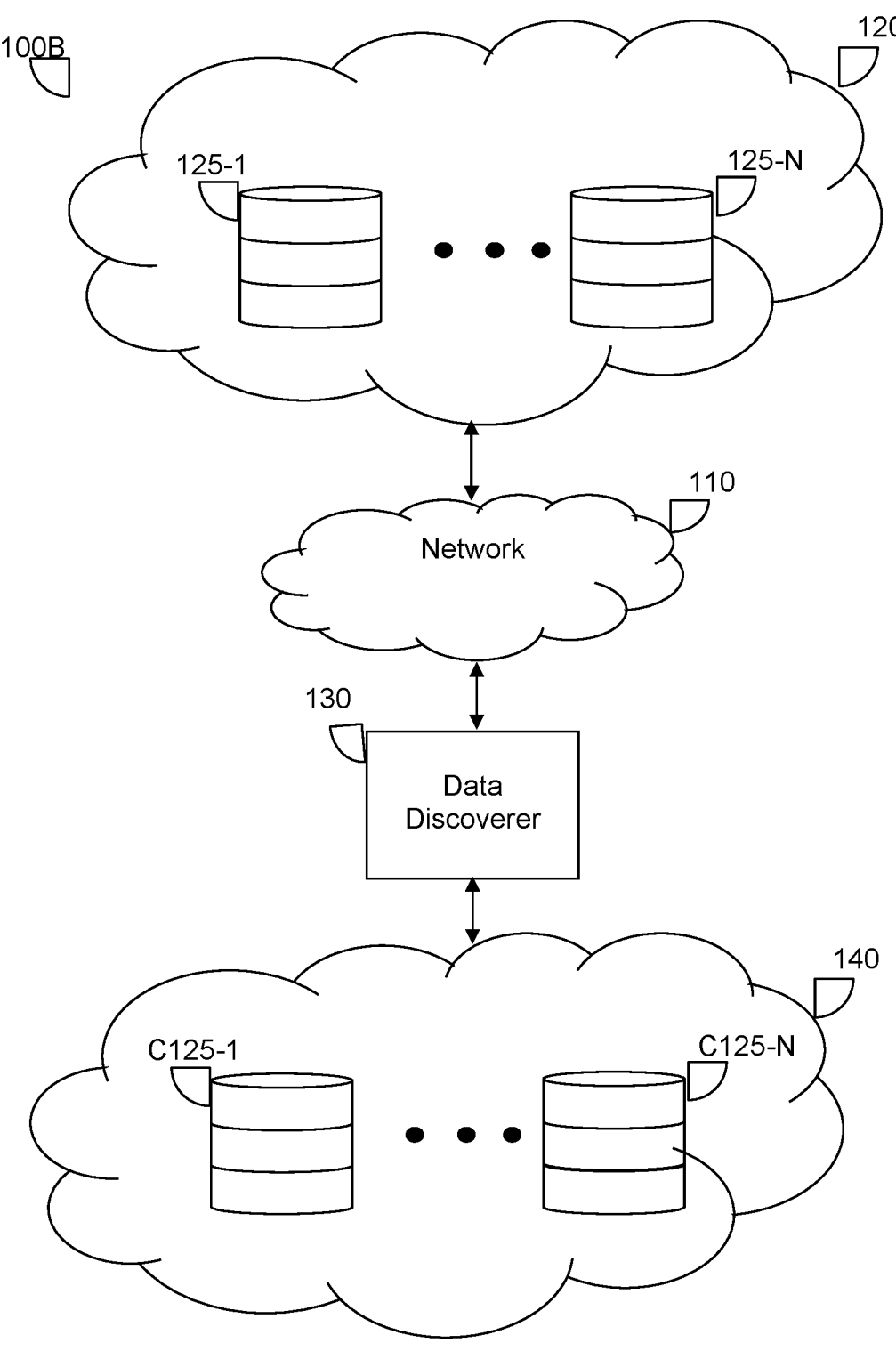

FIG. 1B further shows disk copies C125-1 through C125-N (hereinafter referred to as disk copies C125 for simplicity) that are copies of respective disks 125 which may be created as clones of snapshots in accordance with some embodiments, for example, when their respective disks are determined as containing data stores. The disk copies C125 may be created and connected to engines (not shown) run via the data discoverer 130, for example via one or more virtual machines running on the data discoverer 130. It should be noted that a single data discoverer 130 is depicted for simplicity purposes, but that multiple data discoverers may be utilized without departing from the scope of the disclosure. Each data discoverer may run one or more virtual machines, each virtual machine being config-ured with one or more engines as described herein.

Figure 2:
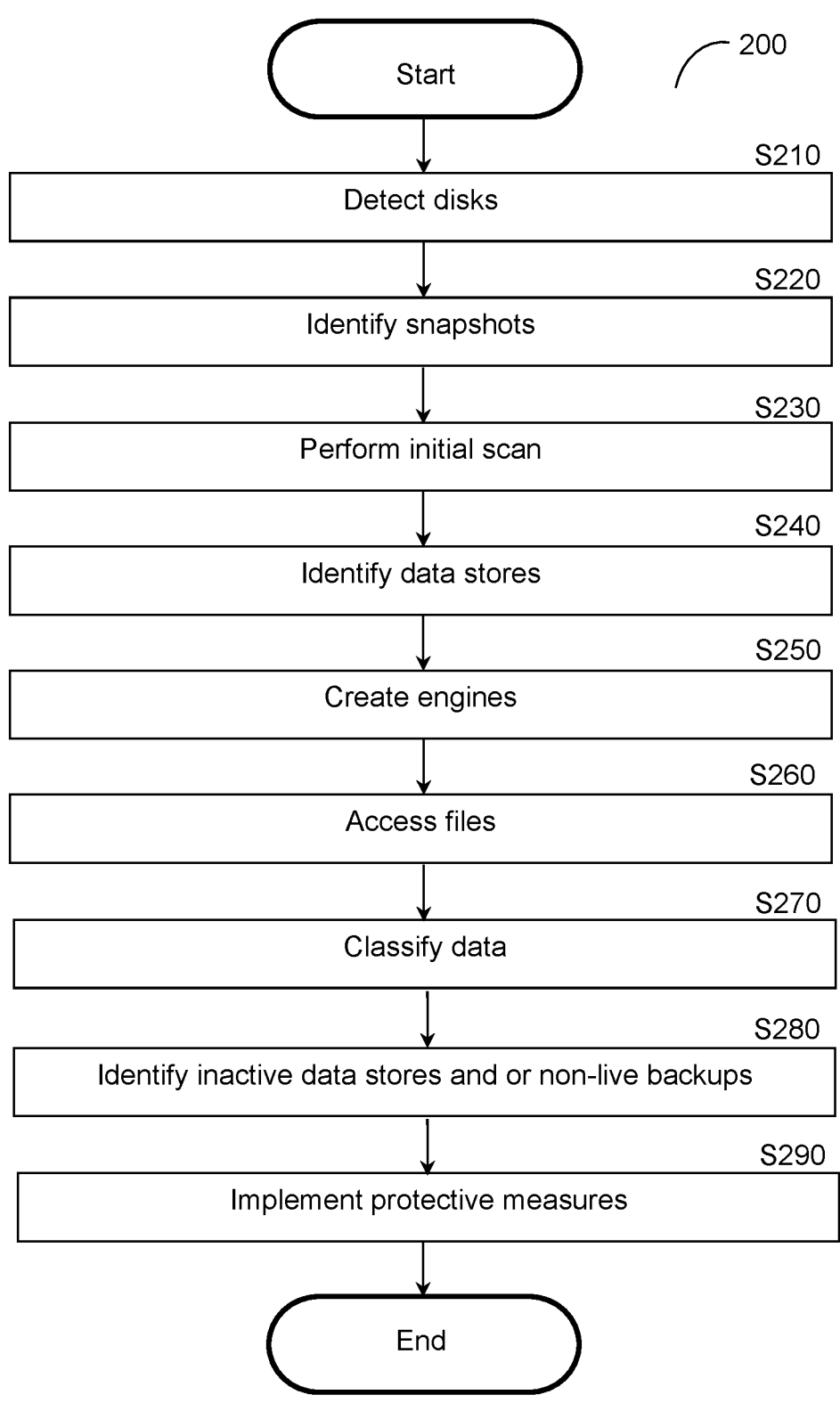
FIG. 2 is a flowchart illustrating a method for data discovery according to an embodiment.

FIG. 2 is a flowchart 200 illustrating a method for data discovery according to an embodiment. In an embodiment, the method is performed by the data discoverer 130, FIG. 1.

At S210, disks in an environment (e.g., the cloud envi-ronment 120, FIGS. 1A-B) are detected. Each disk may be, for example but not limited to, a virtual hard disk. In an embodiment, S210 includes analyzing one or more program-ming interfaces (e.g., application programming interfaces) used for communications between components in the envi-ronment or between components in the environment and external components (i.e., components outside the environ-ment) in order to detect disks. Specifically, such program-ming interfaces include data used to query disks in the environment, and this data used to query disks can be analyzed to identify the disks to be queried. Such data may include, but is not limited to, identifiers of disks (e.g. names), disk locations (e.g., defined with respect to paths), and other data uniquely identifying disks to be queried.

At S220, a snapshot is identified for each detected disk. In an embodiment, S220 may include checking whether each disk has a snapshot stored thereon by searching a directory for a snapshot corresponding to each identified drive and identifying the most recently updated snapshot for each disk. In a further embodiment, when a snapshot cannot be found for a detected disk, S220 further includes creating a snapshot for that disk. To this end, in such an embodiment, S220 includes copying files of the disk that lacks a snapshot in order to create a snapshot which is a full, read-only copy of the disk. The identified snapshots include any snapshots created in this manner.

At S230, an initial scan of the identified snapshots is performed. The initial scan may include scanning a sample of data of each snapshot.

In an embodiment, the initial scan includes first scanning only a limited set of data within each snapshot in order to determine a likelihood that the corresponding disk contains a data store such that a full scan of a given snapshot is only performed when it is determined that the disk likely contains a data store based on the initial scan of the limited set of data.

As a non-limiting example, only the first 100 blocks of the disk may be scanned. In an embodiment, if the initial scan for a given disk yields a likelihood below a threshold (i.e., such that the disk is unlikely to contain a data store), the initial scan terminates and a full scan of the disk (e.g., scanning the entire snapshot of the disk) is avoided; other-wise (i.e., if the partial scan indicates that the disk likely contains a data store), a full scan of the snapshot may be performed. By scanning only a limited set of data initially, unnecessary processing can be avoided. Further, it has been identified that analysis of only a small sample of the blocks of the snapshot can be indicative of whether the disk contains a data store to a relatively high degree of accuracy such that a sample of blocks can be scanned in order to determine whether to perform a full scan without introduc-ing a significant number of false negatives or false positives.

Figure 3:
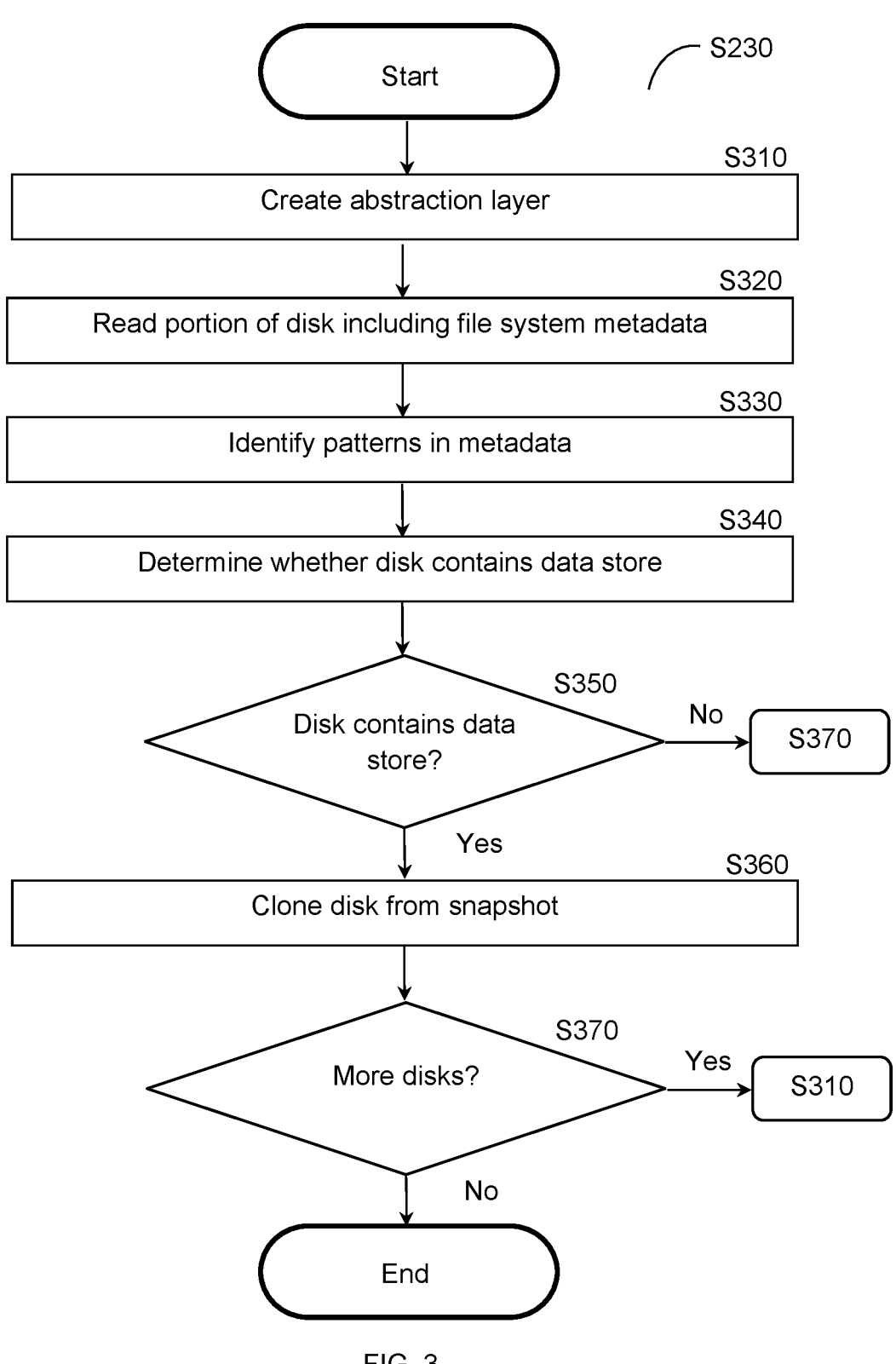
FIG. 3 is a flowchart illustrating a method for performing an initial scan according to an embodiment.

A process which may be utilized to perform the initial scans is now described with respect to FIG. 3. FIG. 3 is a flowchart 300 illustrating a method for performing an initial scan according to an embodiment.

At optional S310, an abstraction dataset is created for the disk. In an embodiment, S310 includes creating a mount of a storage device containing the disk, where the mount is configured to directly access at least a portion of the disk. To this end, the mount may be configured to call a direct read application programming interface (API) of the cloud environment in which the storage device is deployed. The mount may be a lazy mount configured to only fetch certain blocks such as, for example, only a portion or all of the blocks of the file system metadata. The mount is configured to create the abstraction dataset using the portion of the disk directly accessed via the mount.

Creating the mount may allow for masking the presence of the mechanism used to fetch data from the disk in order to scan the file system of the disk. In other words, other components of the scanning software used to scan the disk will be unaware of the precise manner by which the initial scan is performed. The mount may be utilized to create an abstraction dataset that includes the relevant portion(s) of the disk to be read.

At S320, a portion of the disk including file system metadata is read. The file system metadata contains a structure of the file system of the disk.

In an embodiment, S320 includes calling a direct read API of the cloud environment in which the disk is deployed in order to directly access the portion of the disk to be read through an existing snapshot of this disk. The data is accessed directly, i.e., without needing to first copy the snapshot before reading. Such a direct read API may be provided by an operator of the cloud environment having access to the layout of the disk, and may therefore allow for parsing the disk and accessing only relevant portions of the disk.

In an embodiment, when the direct read API is configured to access certain portions of the snapshot, the direct read API may be used to access only relevant portions of the snapshot such as only accessing file system metadata for the disk. To this end, in such an embodiment, only portions of the disk containing file system metadata is read at S320 rather than the entire disk. In a further embodiment, the portion of the disk to be read only includes a portion of the file system metadata (e.g., a subset of such metadata). Alternatively, S320 may include reading from an abstraction dataset cre-ated via a mount configured to access only a portion of the data from a snapshot, where the mount in turn may use a direct access API.

As a non-limiting example, a disk may contain 100 gigabytes (GB) of data, of which file system metadata structures only make up 100 megabytes (MB) of the entire disk. In such an example, a limited sample of 1 MB of the file system metadata structures is read in order to obtain the data needed to be analyzed in order to determine whether the disk contains a data store.

In this regard, it is noted that the file system metadata includes the information that is relevant for determining, with a high degree of confidence, whether the disk contains a data store. Thus, reading only the file system metadata allows for reducing the amount of data that needs to be read and analyzed in order to identify the presence of data stores in the cloud environment. It has further been identified that only a portion of the file system metadata needs to be analyzed in order to determine whether a disk contains a data store with high accuracy. Thus, reading only a subset of the file system metadata allows for accurately identifying data stores in a cloud environment while minimizing the amount of data that needs to be analyzed.

Moreover, using a direct read API allows for accessing only certain parts of the data of the disk (e.g., only the file system metadata or a portion thereof) using native tools of the cloud environment and without requiring specialized code for parsing data in each disk. This, in turn, reduces the amount of data processing needed in order to locate and analyze relevant portions of the disk. In this regard, it is noted that using such a direct access API to access data to be analyzed in the initial scan is more efficient and less expensive with respect to computing resources than reading data directly from a complete copy of each disk.

At S330, the portion of the disk read at S320 is analyzed. The analysis may include, but is not limited to, identifying certain characteristics of files related to known patterns of files indicative of the presence of a data store. In an embodiment, S330 includes searching through the portion of the disk in order to determine whether certain files are on the disk and to identify those files. These files may be identified based on, but not limited to, file names, file types, directory information of files, file paths, combinations thereof, and the like.

To this end, in an embodiment, S330 includes detecting potential data store files which may be indicative that a data store exists on each disk in order to determine which disks contain data stores, thereby detecting data stores in the environment. In an embodiment, S330 includes applying data store existence rules to data (e.g., file metadata such as file names) found in the initial scan. Such rules may define predetermined characteristics of such data that are indicative of a data store existing on a given disk, for example, with respect to text included in file names found during the initial scan. As a non-limiting example, a data store existence rule may indicate that a file name containing the text "mySQL" is likely to have a data store such that a disk containing a file having a file name "mySQLDB" is determined to contain a data store.

At S340, it is determined whether the disk contains a data store based on the analysis. More specifically, when one or more files or characteristics of files indicative of the disk containing a data store are identified in the analysis, the disk may be determined to contain a data store.

At S350, it is checked whether the disk was determined to contain a data store and, if so, execution continues with S360; otherwise, execution continues with S370.

At S360, when the disk has been determined to contain a data store, a clone of a snapshot of the disk is created. The clone is a readable copy of the snapshot which can be further analyzed. By only cloning the snapshot when the disk is determined to contain a data store, unnecessary copying (i.e., copying of snapshots of disks that do not contain data stores and therefore do not require further analysis) may be avoided.

At S370, it is determined whether an initial scan is needed for additional disks and, if so, execution continues with S310; otherwise, execution terminates. In some implementations, an initial scan is performed for each of the disks identified in a cloud environment (e.g., each of the disks detected at S210, FIG. 2).

Returning to FIG. 2, at S240, data stores in the cloud environment are identified based on the initial scan. In an embodiment, the data stores are identified as being located in disks determined to contain data stores, for example as described above with respect to FIG. 3.

At S250, engines are created for the disks and connected to the disks. More specifically, an engine is created for and connected to each disk determined to contain a data store. The engine for each disk is created at least for the purpose of accessing data of the disk and, in particular, data of one or more files contained in the data store of the disk. The created engine may be, but is not limited to, a database engine. In some implementations, the created engine may have limited functionality as compared to an engine already existing for the disk, for example, by being configured to read data from databases but not to create, update, or delete such data.

It is noted that files in such data stores are formatted according to respective proprietary database formats, and that effectively querying files in such proprietary formats involves using an appropriate engine configured to query files in that format. To this end, each created engine may be configured to query files in a particular database format in order to access the data contained therein. In some embodiments, the engine created for each disk has a custom configuration that is suitable for scanning such formatted files. This may include, for example, creating an engine that is configured as close as possible to an existing engine of the disk or otherwise creating an engine having the same read configuration as a known engine configured to query files in the respective database format.

Figure 4:
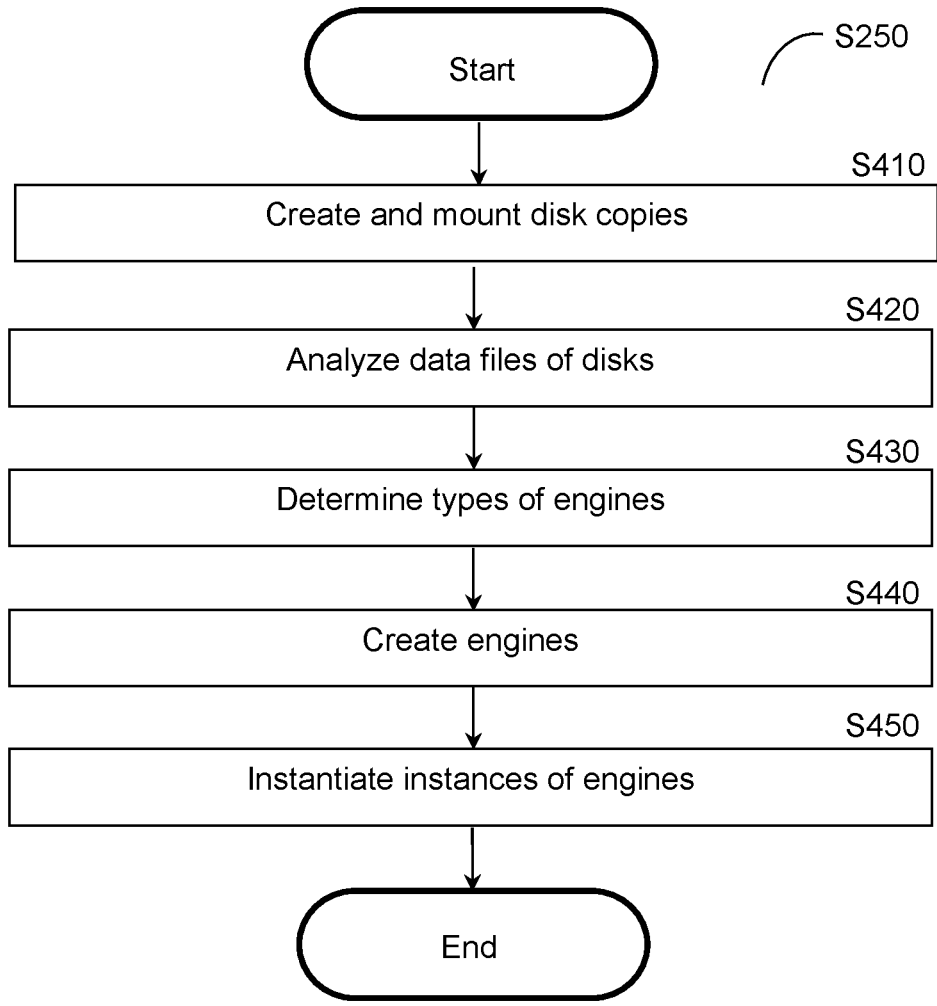
FIG. 4 is a flowchart illustrating a method for creating engines for accessing data stores according to an embodiment.

To this end, in such an embodiment, S250 may include creating an engine as described further with respect to FIG. 4. FIG. 4 is a flowchart S250 illustrating a method for creating engines for accessing data stores according to an embodiment. The method may be performed with respect to snapshots of disks such as, for example, the snapshots identified at S220, FIG. 2.

At S410, a copy of each disk to be accessed via engines is mounted to a virtual machine. In an embodiment, S410 may include encrypting or unencrypting a snapshot of each disk and creating a copy of each disk in an isolated environment (e.g., an environment outside of the original environment of the original disk or otherwise an environment in which accessing the copy of the disk will not affect performance of the original disk). One or more virtual machines configured to scan disks are instantiated, and each disk copy is mounted to one of the instantiated virtual machines.

At S420, data files of disks are analyzed. The analysis may include, but is not limited to, identifying engine-relevant parameters indicated in files of each disk, identifying relationships between files (e.g., paths between files) of each disk, both, and the like. The engine-relevant parameters may be predetermined parameters indicative of a specific engine platform, a specific engine version, or both, needed to at least read from files in a given data store. To this end, S420 may include applying engine-relevant parameter rules which define the parameters in files, the relationships between files, or both, that indicate a need for a particular platform or version of an engine such as a database (DB) engine. Moreover, S420 may include scanning rules of one or more programming interfaces (e.g., application programming interfaces) included in the files of each disk and identifying the engine-relevant parameters and relationships based on the scanned programming interfaces.

As a non-limiting example, a data file may contain data indicating that the data file is a mySQL data file such that applying an engine-relevant parameter rule will yield a determination that an engine running on the mySQL platform is needed to scan files of the disk. As another non-limiting example, a data file may contain data indicating that the data file requires mySQL version 5.0 such that a required version of the engine to be created is mySQL 5.0.

At S430, based on the analysis, one or more types of engines to be created are determined. Each type of engine corresponds to a particular engine configuration, which in turn corresponds to a respective database format for files to be queried by the engine. In some implementations, the types of engines to be created may be selected based on preconfigured types of engines, which in turn may be defined with respect to known types of engines. As a non-limiting example, a preconfigured type of engine may correspond to a known mySQL 5.0 engine and have a predetermined configuration that is the same as or similar to a configuration of the known mySQL 5.0 engine. In such an example, when the engine-relevant parameters of one or more disks indicates that mySQL 5.0 is required, it is determined that a mySQL 5.0 type of engine is to be created. More specifically, the type of engine to be created may be determined such that the resulting engine at least has the same read configuration as a known engine corresponding to a particular database format such that the configuration is similar for purposes of accessing data. In some implementations, such a similar engine may be an engine having the configuration matching a known configuration of an engine having a particular type and version.

At S440, the determined types of engines are created. The created engines have respective configurations which correspond to their respective types. Each engine may be created on a server or other system (e.g., the data discoverer 130, FIG. 1) and communicatively connected to the respective disks. In some embodiments, S440 further includes creating a software package such as a software container for each determined type of engine that is configured to run the respective engine.

Creating engines allows for connecting those engines directly to the respective disks and controlling permissions for the created engines in order to scan the snapshots of the respective disks. Further, by creating engines in a server outside of a cloud computing environment in which the original disks are deployed, the engines may be implemented without requiring using the cloud environment's computing resources. As noted above, accessing data stores through systems already deployed in a cloud environment typically requires obtaining credentials for accessing each data store individually. Creating an engine externally or otherwise creating an engine on a system for which such access is already permitted allows access to data in the disks without such individualized permissions. As a non-limiting example, a server having the created engine installed thereon may only need credentials to access a cloud environment generally in order to access the data stores in the disks. Further, creating an engine and connecting a system including the engine to a disk allows for accessing data in data stores of the disk regardless of whether the disk is connected to any other system in the cloud environment.

At S450, one or more instances of each created engine is instantiated. The number of instances of each engine may be based on a number of disks for which that type of engine is required, and the instances may be instantiated in parallel in order to allow for simultaneous scanning of the disks. Each engine instance may be instantiated on a respective virtual machine connected to the copy of the corresponding disk.

Returning to FIG. 2, at S260, the files in each data store are accessed using the respective engines. In an embodiment, S260 may include reading a database schema (e.g. reading database lists, tables, columns, etc.). In a further embodiment, S260 may include sampling data from data structures (e.g., sampling tables data).

At optional S270, the accessed data may be classified. In an embodiment, S270 includes analyzing the accessed data (e.g., analyzing the sampled tables data) and determining, based on the analysis, whether the data includes any data classes known to be sensitive.

At optional S280, inactive data stores, backups of data stores which are not live, or both, are identified. In an embodiment, each inactive data store is a data store that is not connected to any other physical or virtual machines. In another embodiment, each non-live data store is a data store that has been deleted but for which a backup exists (i.e., a backup representing the data store has not been deleted).

In an embodiment, the accessed data (e.g., data structures found through reading the database schema) is analyzed in order to identify connections between each data store and other physical or virtual machines. In another embodiment, S280 further includes comparing between the data stores identified in the backups and the data stores during the initial scan in order to determine one or more data stores which have been deleted (i.e., not identified at S240) but are still represented in a backup stored in the storage.

At S290, protective measures may be implemented. In an embodiment, S290 includes performing one or more mitigation actions with respect to disks containing data stores. In a further embodiment, S290 also includes determining a priority of the mitigation actions and performing the mitigation actions in an order based on their respective priorities.

The mitigation actions to be performed may be predetermined mitigation actions for respective types of security issues. In an embodiment, S290 may further include determining whether a security issue has been identified for the data store based on classifications of data in the data store, for example, classifications determined as described above with respect to S270. The sensitivity of the data and the identified security issues may be utilized to determine priorities of security issues and appropriate mitigation actions for mitigating the security issues.

In some embodiments, S290 further includes implementing protective measures with respect to any inactive or unmanaged data stores identified at S280. As a non-limiting example, such protective measures for inactive or unmanaged data stores may include deleting such data stores, sending notifications indicating that such data stores exist, and the like.

Figure 5:
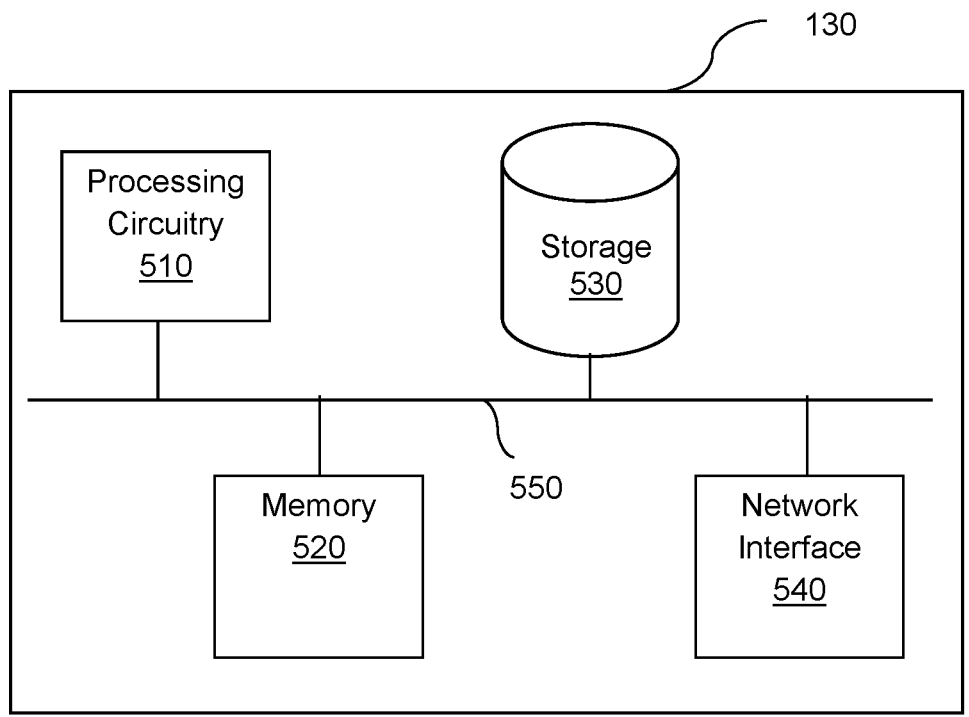
FIG. 5 is a schematic diagram of a data discoverer according to an embodiment.

FIG. 5 is an example schematic diagram of a data discoverer 130 according to an embodiment. The data discoverer 130 includes a processing circuitry 510 coupled to a memory 520, a storage 530, and a network interface 540. In an embodiment, the components of the data discoverer 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the data discoverer 130 to communicate with, for example, the cloud environment 120 (particularly, the disks 125 and the copy disks C125 in the cloud environment 120).

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for discovering data store locations, comprising:
   reading, for each disk of a plurality of disks deployed in a cloud environment, only a portion of a snapshot of the disk accessed via a cloud provider tool, wherein the portion of the snapshot of each disk accessed via the cloud provider tool includes file system metadata of a file system of the disk, wherein the cloud provider tool is configured to provide direct access to data from each of the plurality of disks;
   analyzing the portion of the snapshot of each disk of the plurality of disks to determine whether each disk contains a data store; and identifying, based on the analysis, at least one data store in the cloud environment;
   creating an abstraction dataset for each disk of the plurality of disks using the cloud provider tool, wherein the abstraction dataset for each disk consists of the portion of the snapshot of the disk accessed via the cloud provider tool, wherein the portion of the snapshot is read from the abstraction dataset;
   wherein creating an abstraction dataset for each disk further comprises: creating a mount of a storage device containing the disk, wherein the mount is configured to retrieve data from the disk;
   wherein the mount is configured to retrieve only a portion of data from the disk;
   creating at least one engine based on data in the identified at least one data store, wherein each created engine is configured to read files having a respective database format, wherein creating each engine further comprises creating a software package defining a configuration corresponding to a type of the engine; and
   accessing data in the identified at least one data store using the created at least one engine.

2. The method of claim 1, wherein the portion of the snapshot of each disk consists of a subset of the file system metadata of the file system of the disk.

3. The method of claim 1, wherein the cloud provider tool is a direct read application programming interface configured to access only a portion of the data from each of the plurality of disks, wherein the portion of the snapshot of each disk accessed via the cloud provider tool consists of the file system metadata of the disk.

4. The method of claim 1, wherein the portion of the snapshot of each disk is read without copying the entire snapshot of each disk.

5. The method of claim 1, wherein whether each disk contains a data store is determined based on at least one of: file name of at least one file stored on the disk, file type of at least one file stored on the disk, directory information of at least one file stored on the disk, and file path of at least one file stored on the disk.

6. The method of claim 1, further comprising:
   analyzing the data in the identified at least one data store in order to identify the plurality of engine-relevant parameters.

7. A non-transitory computer readable medium having stored thereon instructions for causing a processing circuitry to execute a process, the process comprising:

reading, for each disk of a plurality of disks deployed in a cloud environment, only a portion of a snapshot of the disk accessed via a cloud provider tool, wherein the portion of the snapshot of each disk accessed via the cloud provider tool includes file system metadata of a file system of the disk, wherein the cloud provider tool is configured to provide direct access to data from each of the plurality of disks;

analyzing the portion of the snapshot of each disk of the plurality of disks to determine whether each disk contains a data store;

creating an abstraction dataset for each disk of the plurality of disks using the cloud provider tool, wherein the abstraction dataset for each disk consists of the portion of the snapshot of the disk accessed via the cloud provider tool, wherein the portion of the snapshot is read from the abstraction dataset;

wherein creating an abstraction dataset for each disk further comprises: creating a mount of a storage device containing the disk, wherein the mount is configured to retrieve data from the disk;

wherein the mount is configured to retrieve only a portion of data from the disk;

and identifying, based on the analysis, at least one data store in the cloud environment; creating at least one engine based on data in the identified at least one data store, wherein each created engine is configured to read files having a respective database format, wherein creating each engine further comprises creating a software package defining a configuration corresponding to a type of the engine; and accessing data in the identified at least one data store using the created at least one engine.

8. A system for discovering data store locations, comprising:

a processing circuitry; and a memory, the memory containing instructions that, when executed by the processing circuitry, configure the system to: read, for each disk of a plurality of disks deployed in a cloud environment, only a portion of a snapshot of the disk accessed via a cloud provider tool, wherein the portion of the snapshot of each disk accessed via the cloud provider tool includes file system metadata of a file system of the disk, wherein the cloud provider tool is configured to provide direct access to data from each of the plurality of disks;

analyze the portion of the snapshot of each disk of the plurality of disks to determine whether each disk contains a data store;

creating an abstraction dataset for each disk of the plurality of disks using the cloud provider tool, wherein the abstraction dataset for each disk consists of the portion of the snapshot of the disk accessed via the cloud provider tool, wherein the portion of the snapshot is read from the abstraction dataset;

wherein creating an abstraction dataset for each disk further comprises: creating a mount of a storage device containing the disk, wherein the mount is configured to retrieve data from the disk;

wherein the mount is configured to retrieve only a portion of data from the disk;

and identify, based on the analysis, at least one data store in the cloud environment; create at least one engine based on data in the identified at least one data store, wherein each created engine is configured to read files having a respective database format, wherein the system is further configured to create a software package defining a configuration corresponding to a type of the engine; and access data in the identified at least one data store using the created at least one engine.

9. The system of claim 8, wherein the portion of the snapshot of each disk consists of a subset of the file system metadata of the file system of the disk.

10. The system of claim 8, wherein the cloud provider tool is a direct read application programming interface configured to access only a portion of the data from each of the plurality of disks, wherein the portion of the snapshot of each disk accessed via the cloud provider tool consists of the file system metadata of the disk.

11. The system of claim 8, wherein the portion of the snapshot of each disk is read without copying the entire snapshot of each disk.

12. The system of claim 8, wherein whether each disk contains a data store is determined based on at least one of: file name of at least one file stored on the disk, file type of at least one file stored on the disk, directory information of at least one file stored on the disk, and file path of at least one file stored on the disk.

13. The system of claim 8, wherein the system is further configured to:

analyzing the data in the identified at least one data store in order to identify the plurality of engine-relevant parameters.

* * * * *